(12) United States Patent
Carlson et al.

(10) Patent No.: US 11,533,323 B2
(45) Date of Patent: Dec. 20, 2022

(54) COMPUTER SECURITY SYSTEM FOR INGESTING AND ANALYZING NETWORK TRAFFIC

(71) Applicant: Target Brands, Inc., Minneapolis, MN (US)

(72) Inventors: Chris Carlson, Minneapolis, MN (US); Paul Melson, Minneapolis, MN (US); Paul Dokas, Minneapolis, MN (US); Justice Renée Bovee, Minneapolis, MN (US); Adam Lesperance, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 17/009,211

(22) Filed: Sep. 1, 2020

(65) Prior Publication Data

US 2021/0112082 A1    Apr. 15, 2021

Related U.S. Application Data

(60) Provisional application No. 62/913,545, filed on Oct. 10, 2019.

(51) Int. Cl.
*G06F 15/173* (2006.01)
*H04L 9/40* (2022.01)

(52) U.S. Cl.
CPC ...... *H04L 63/1416* (2013.01); *H04L 63/0236* (2013.01); *H04L 63/1433* (2013.01)

(58) Field of Classification Search
CPC ............... G06F 21/604; G06F 21/6254; G06F 16/337; G06F 16/951; G06F 21/6218; H04L 63/101; H04L 63/1416; H04L 63/1425; H04L 63/1433; H04L 63/1441; H04L 63/145; H04L 9/3247; H06N 5/003
See application file for complete search history.

(56) References Cited

U.S. PATENT DOCUMENTS 9,038,177 B1    5/2015  Tierney
9,516,053 B1   12/2016  Muddu et al.
10,135,862 B1 * 11/2018 McClintock ......... H04L 63/145
(Continued)

OTHER PUBLICATIONS

Logrhythm.com [online], "Enrich Your SIEM with Real-Time Threat Intelligence," Dec. 5, 2017, retrieved on Aug. 27, 2020 retrieved from URL <https://logrhythm.com/blog/enrich-your-siem-with-real-time-threat-intelligence/>, 3 pages.

*Primary Examiner* — Dustin Nguyen
(74) *Attorney, Agent, or Firm* — Fish & Richardson P.C.

(57) ABSTRACT

This document generally describes computer systems, processes, program products, and devices for the rapid and automated collection, storage, and analysis of network events to provide improved and enhanced security analysis. The system can include an extensible framework for pipelines to process, normalize, and decorate network events created in response to network activity, which can permit the system to readily scale up and down to ingest large volumes and variations in network activity. For example, pipeline can match data in the network events with stored Indicators of Compromise (IoCs) and decorate the network events with the IoCs before the network events are stored and subsequently analyzed.

16 Claims, 6 Drawing Sheets

(56) References Cited

U.S. PATENT DOCUMENTS

| | | | |
|---|---|---|---|
| 2010/0268959 A1* | 10/2010 | Lowe | H04L 9/3247 |
| | | | 713/176 |
| 2014/0068763 A1* | 3/2014 | Ward | H04L 63/1425 |
| | | | 726/22 |
| 2014/0359761 A1 | 12/2014 | Altman et al. | |
| 2015/0373043 A1* | 12/2015 | Wang | G06F 21/6254 |
| | | | 706/12 |
| 2016/0080418 A1* | 3/2016 | Ray | H04L 63/1416 |
| | | | 726/1 |
| 2016/0308898 A1* | 10/2016 | Teeple | H04L 63/1441 |
| 2017/0006054 A1* | 1/2017 | Stiansen | H04L 63/1425 |
| 2017/0057492 A1 | 3/2017 | Edgington et al. | |
| 2017/0063888 A1 | 3/2017 | Muddu et al. | |
| 2017/0187741 A1* | 6/2017 | Desch | H04L 63/1433 |
| 2017/0310774 A1 | 10/2017 | Nano et al. | |
| 2017/0366582 A1* | 12/2017 | Kothekar | H04L 63/101 |
| 2018/0027006 A1* | 1/2018 | Zimmermann | G06F 21/6218 |
| | | | 726/11 |
| 2018/0176260 A1* | 6/2018 | Palumbo | G06F 21/604 |
| 2018/0191747 A1* | 7/2018 | Nachenberg | H04L 63/1416 |
| 2019/0095599 A1* | 3/2019 | Iliofotou | G06F 16/337 |
| 2019/0104140 A1* | 4/2019 | Gordeychik | G06F 16/951 |
| 2019/0207966 A1* | 7/2019 | Vashisht | H04L 63/1416 |
| 2020/0128025 A1* | 4/2020 | Sant-Miller | G06N 5/003 |

* cited by examiner

COMPUTER SECURITY SYSTEM FOR INGESTING AND ANALYZING NETWORK TRAFFIC

CROSS REFERENCE TO RELATED APPLICATIONS

This application claims the benefit of U.S. Provisional Application Ser. No. 62/913,545, filed Oct. 10, 2019. The disclosure of the prior application is considered part of (and is incorporated by reference in) the disclosure of this application.

TECHNICAL FIELD

The present document generally relates to computer network security, such as monitoring for and identifying potentially malicious network traffic.

BACKGROUND

Network security includes policies, practices, and devices adapted to monitor and prevent unwanted access, misuse, modification, or attacks on computer networks and network-accessible resources. Network security involves differentiating and restricting between authorized and unauthorized access to data and services in a network, which can be controlled by one or more authentication schemes. Malicious actors are users that are not authorized to access the network (or particular data and resources of the network) but who nevertheless attempt to circumvent the network's implemented security controls in order to gain access to the network, either by thwarting network security measures or circumventing them by, for example, getting an authorized user to unwittingly perform actions that provide malicious actors with access. For example, malicious actors may either directly attempt to thwart network security measures, such as through an arbitrary execution exploit, or indirectly attempt to gain access through an authorized user, such as through a phishing scheme.

Network security can include proactive and reactive security measures that either block security threats before they exploit a security vulnerability, or the security measures are deployed once the vulnerability has been exploited to mitigate the exploit. Such proactive and reactive security measures can be performed automatically and/or manually, such as by security analysts who are experts in identifying and eliminating security threats in a network. Security analysts can perform a variety of tasks, such as investigating potential security vulnerabilities and instances of potential malicious attacks, differentiating between benign and malicious network activity, and formulating response strategies when malicious attacks are found.

SUMMARY

This document generally describes computer systems, processes, program products, and devices for the rapid and automated collection, storage, and analysis of network events to provide improved and enhanced security analysis. The system can include an extensible framework for pipelines to process, normalize, and decorate network events created in response to network activity, which can permit the system to readily scale up and down to ingest large volumes and variations in network activity. For example, pipeline can match data in the network events with stored Indicators of Compromise (IoCs) and decorate the network events with the IoCs before the network events are stored and subsequently analyzed.

Such pipelines can be part of a larger cybersecurity platform that is designed to store network and system events for one or more networks, such as those associated with a company or other organization, and to analyze those network events to identify potential cybersecurity threats to the one or more networks. The pipelines can be part of the data ingestion of network events into a data repository in which the network events can be analyzed. However, the type, content, and structure of network events that are ingested can differ greatly depending on the device from which the network events are generated, which can make analysis challenging and limited. The pipelines can use data schema and corresponding rules to identify various types of network events, and can normalize those network events so that they are stored in a standard, and consistent way so that they can be readily process and analyzed. Additionally, such schema and corresponding rules can be used to annotate network events with additional contextual information (e.g., information about source of network event, such as geographic information, historical behavior of source, including whether source has been known to be or is associated with sources of malicious network activity) before they are stored, which can enhance the analysis that can be performed on those network events. Additionally, by decorating the network events during ingestion, the annotated information can be more efficiently searched and analyzed than it would be, for example, with undecorated network events that would have to be cross-referenced with other data sources providing annotation information during runtime search and analysis on the network events.

Additionally, network events can fluctuate over time in frequency and volume and, as a result, the pipelines can be extensibly designed to spin up and down instances to accommodate such fluctuations in network events. For example, network traffic may be greater during the day and less over night. As a result, pipeline instances, each of which can be designed to access and use the same event decoration techniques, can be spun up and down in response to increases and decreases in network events, in order to maintain a minimum latency while reducing computational resource utilization in ingesting network events into a cybersecurity platform for analysis.

In one aspect, a system is used for the generation and analysis of event data related to the operation of a data network. The system can include a plurality of network sensors configured to: sense operations of the data network; responsive to sensing the operations of the data network, generate event data objects that record the operations of the data network. The system can include one or more decorator pipelines configured to: examine an undecorated event data object; identify a key-value from the undecorated event data object; identify, in an Indicator of Compromise (IoC) datastore, an IoC based on a matching of a key-field of the IoC with the key-value; decorating the undecorated event data with the identified IoC to generate a decorated event data object; and store the decorated event data object in an event datastore. Similar methods, products, and devices may also be used.

Implementations can include one, none, or some of the following details. The system further comprising the event datastore, the event datastore configured to receive a query; and responsive to receiving the query, returning the decorated event data object. The event datastore stores a plurality of similarly-decorated event data objects that have each been decorated with a same IoC such that the same IoC is stored redundantly by the event datastore. Each similarly-decorated event data object is stored separately by the event datastore in a corresponding memory location, wherein the each of the memory locations stores a separate copy of the same IoC. The IoC datastore stores data received from a threat data provider external to the data network and also stores data from analysis performed within the data network. The key-field is one of the group consisting of Internet Protocol (IP) address, domain name, and file hash. The undecorated data object enters the decorator pipeline with a hash-value generated by hashing a file of an operation of the data network, and wherein the decorator pipeline is configured to identify the identified IoC based on a matching of a hash-field of the IoC with the hash-value.

The technology described throughout this document can, in some instances, provide one or more of the following advantages. By performing decoration of network events at the time of ingestion, instead of later after the events are ingested, processing efficiencies may be realized that allow for large-scale and fine-grain data collection of network activity using less hardware resources than would be otherwise required with on the fly non-redundant. This also allows for faster detection because identification may be based on a one-to-one match, which can improve performance and efficiency later in the system. For example, as a single event moves through the system, relevant characteristics are directly appending to the event and are presented at the end as a single atomic package. The stored network events can be kept in a rolling buffer for access when investigating recent network events for possible intrusion, for testing new queries to be used as rules, etc.

Other features, aspects and potential advantages will be apparent from the accompanying description and figures.

DESCRIPTION OF DRAWINGS

Like reference symbols in the various drawings indicate like elements

DETAILED DESCRIPTION

An event pipeline can be created to create and store events generated based on network and system activity. A network sensor array can generate event data, and the events can be serialized and provided to a flexible number of pipelines that each normalize and decorate the events so that the events comply with a universal set of formatting requirements and so that the events include data related to the events and useful for security analysis. These events can be deserialized and stored in an aggregator datastore. A security frontend can provide a user with a GUI with which the user can analyze the events, set rules to be run on incoming data, etc.

Using this architecture, a modern and very large-scale network can be monitored. This architecture can scale efficiently with the size of the network, providing real-time or near-real-time information to interested parties about events that occur within the network. In some implementations, events can be observed, documented, and tested with security rules in time-windows of seconds or a few minutes. This can allow for rapid detection and mitigation of security threats even in a large, geographically and logically diverse network.

Figure 1A:
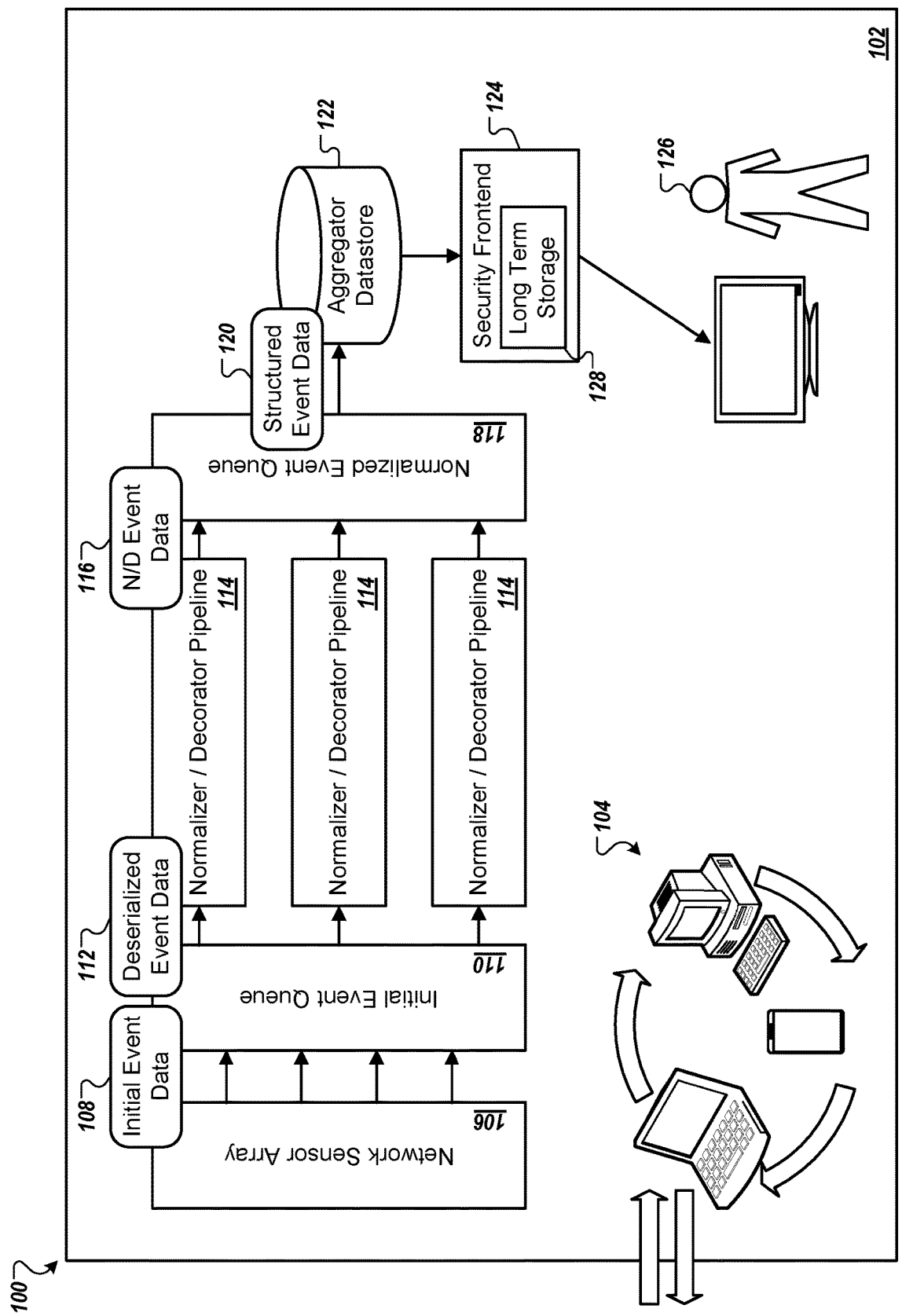
FIGS. 1A and 1B are block diagrams of an example system for generating events in response to network activity.

FIG. 1A is a block diagram of an example system 100 for generating events in response to network activity. In the system 100, a network 102 is being protected by one or more security analysts. The security analysts are users that are tasked with monitoring the security state of the network 102 and to prevent malicious activity like malware execution, data exfiltration, etc.

The network 102 is, for example, a local network, intranet, virtual private network, or other data network used by an organization. The network 102 can include networking hardware such as cables, wireless access points, routers, gateways, firewalls, etc., that work together to allow resident machines 104 to communicate with other resident machines 104 and with computing resources outside of the network 102. The resident machines 104 can include, but are not limited to, personal computers, servers, and mobile devices.

Operations of the network 102 and resident machines 104 may come under attack from malicious actors—users and/or automated services that seek to exploit computing resources they do not own or have authorization to use. The system 100 can be configured to provide monitoring functionality that generates data based on the activity on the network—including malicious activity. This monitoring can then be provided to a security analyst that is tasked with stopping or attempt to stop these attacks through various types of security responses.

When the resident machines 104 participate in data transmission on the network 102, an array of network security sensors 106 can sense the network activity and generate data for one or more events that represent the activity. For example, the sensors 106 can be connected to the physical layer of the network (e.g., wires, wireless data transmissions) and be configured to respond when signals indicate that network activity is happening. The sensors can respond to this sensing by creating data even when the sensed activity is not addressed to or involve the sensors 106. Depending on the size and scale of the network 102, one array of network sensors 106 may have more or fewer sensors than another array of network sensors. In various examples, hundreds, thousands, tens of thousands, or hundreds of thousands of sensors can be used, although more or fewer are possible. In addition or in the alternative, the sensors 106 can also record non-network activity. For example, when devices hosted on the network perform sensitive operations (e.g., accessing a sensitive data repository, executing applications, the sensors 106 can sense these activities.

The sensors can provide the initial event data 108 to one or more initial event queues 110. The initial event data 108 may include data objects that do not conform to any single format or structure, may be out of chronological order, and may otherwise be non-homogeneous. The initial event queues 110 can receive the initial event data 108 and deserialize the data objects of the initial event data 108 into deserialized event data 112. The deserialized event data can include all or part of the data included in the initial event data 108, and has been deserialized. In general, serialization of data involves the transforming or reconfiguring of data so that it can be stored, transmitted, etc. For example, the serialization process performed by the initial event queues 110 can include padding out short data strings or removing redundant data, decompressing compressed data, changing the format, etc.

One or more normalizer/decorator pipelines 114 can receive the deserialized event data 112 from the initial event queues 110 and process the deserialized event data 112 into normalized/decorated event data 116. For example, the normalizer/decorator pipelines 114 can normalize the deserialized event data 112 by editing its structure so that the structure complies with one or more standards, and the normalizer/decorator pipelines 114 can decorate the deserialized event data 112 by adding data to the events from other sources (e.g., timestamps, geo-location data, threat intelligence data, a connection-identifier.)

The number of normalizer/decorator pipelines 114 can change depending on the load of the initial event queues 110. For example, new instances of normalizer/decorator pipelines 114 can be generated and used when a backlog of deserialized event data 112 is prepared by the initial event queue 110, and these normalizer/decorator pipelines 114 can be released and idle when the backlog falls under a threshold size, is empty, begins trending downward, etc.

In some cases, the ramp-up of the normalizer/decorator pipelines 114 can be more sensitive than the ramp-down. That is, a particular growth in backlog may cause more normalizer/decorator pipelines 114 to be instantiated faster than a similar reduction in backlog. This may be accomplished, for example, by adding N normalizer/decorator pipelines 114 every time-unit (e.g., second, 30 seconds, minute, hour) a backlog over a certain size is seen, and removing only M normalizer/decorator pipelines 114 every time-unit the backlog over a certain size is not seen, where N is greater than M (e.g., N=2; M=1; e.g., N=4; M=1.) In addition to backlog size, other parameters are possible including, but not limited to, rate of change of backlog, priority of traffic resident in the backlog, price of allocation of resources, etc.

The system 100 can be configured to use the normalizer/decorator pipeline 114 to efficiently make matches and append flags to data. One such type of flag is an Indicator of Compromise (IoC) that records information a compromise. IoC can generally include single pieces of information that can be quickly examined and flagged. By using simple, single data matching, fewer computational resources may be required compared to more complex matching. By appending the IoC with the normalizer/decorator pipeline 114, later elements such as the security frontend 124 may be executed with less resources than would otherwise be needed. For example, the normalizer/decorator pipeline 114 can be configured to match in-network activity to lists of known malicious indicators. This includes hashes (MD5, SHA1 SHA256) of a known-malicious file (e.g. a document with a script containing malicious activity) or an IP address of an endpoint in a network communication. This configuration can tie IoCs to related data early in the process, removing a need to keep tables mapping network activity to IoCs for use later in the pipeline. Other types of matching include, but are not limited to, matching subdomains to top-level domains, use of regular expressions, etc.

An aggregator datastore 122 can collect the structured event data 120 and store the structured event data 120 in an indexable and searchable datastore 122. The aggregator datastore 122 may store all of the structured event data 120 until the aggregator datastore 122 is full or otherwise storing at least a threshold amount of data or data older than a threshold period of time. When this volume or age of data is reached, the oldest data may be discarded, making room for new data. That is, the aggregator datastore 122 may operate as a rolling buffer that provides storage for the new data, discarding the old data. Other storage systems (not shown here for clarity) can be used for long-term or archival storage, which may provide less expensive storage that is slower to respond to queries.

A security front-end 124 can provide a graphical user interface (GUI) to a computer and/or other devices used by a security analyst 126. The GUI can provide the security analyst 126 with access to the structured event data 120 that is stored in the aggregator datastore 122 in a way that allows the security analyst 126 to understand and more quickly investigate security events of the network 102 that may or may not be malicious. For example, the GUI can provide the security analyst 126 with tools to draft queries, test the queries on the structured event data 120, and then store the same query for use as a rule on future events that are collected from the network 102.

In addition, the security frontend 124 can execute one or more rules on the incoming structured event data 120. These rules may contain conditional statements that, if ever found true on incoming event data, trigger response statements. These response statements can include instructions for automated responses (e.g., quarantining a device on the network 102, subjecting a data connection to enhanced analysis) as well as alerts to communicate the fact that a rule was triggered. These alerts may be transmitted to users via one or more channels that include email, text message, and the generation of a ticket in a ticketing system.

The use of the structure of the system 100 allows for efficient generation of alerts and processing of network events. For example, as shown here, both normalization and decoration of event data with IoCs can be performed as part of the ingestion of the network data instead of later once event data objects are created and ingested into storage. By using this type of architecture and performing decoration at the time of ingestion, the computing resources needed for decoration can be reduced. As done here, decoration with IoCs can be as simple as maintaining a dictionary of key:value pairs for various fields, and as the normalizer/decorator pipeline 114 normalizes the event data, the event data value can be run through the dictionary.

Any hits in the dictionary, where a field of the event data object matches a key entry, can result in the copying of the key:value pair to the event data object. As will be understood, this can be implemented in a very efficient and thus fast-to-process format that scales slowly as the number of events grows and as the size of the dictionary grows. By way of comparison, decorating events after they already are stored in a datastore can involve far more complex Boolean operations, repetitive traversals, etc. that have the result of becoming less performant as the number of events or size of the dictionary grows.

In this way, extensive and fine-grain event generation, storage, and analysis can be created with this system 100. In one example, an enterprise data network that connects hundreds of physical locations and millions of devices can be effectively and efficiently monitored. In this example, tens of thousands sensors 106 can produce tens of trillion of events a day (including hundreds of thousands or millions of events a second). The system 100 can be created using hardware resources that may be well within an enterprise of this size and scope, and provide access to events in the aggregator datastore 122 within seconds of the event occurring on the network. Further, the rules may be run on the events every minute or every handful of minutes.

Further, the use of a rolling buffer in the aggregator datastore 122 can ensure that the most relevant events—the newest ones—are always available for analysis. In the above example, a week's worth of events can be stored in the rolling buffer. Some indexing can be built on the entire week's worth of data, with enhanced indexing being built on the newest data. In this way, rules to identify potentially malicious activity can be run on the newest data at high speed and efficiency, without requiring re-indexing of all data.

Figure 1B:
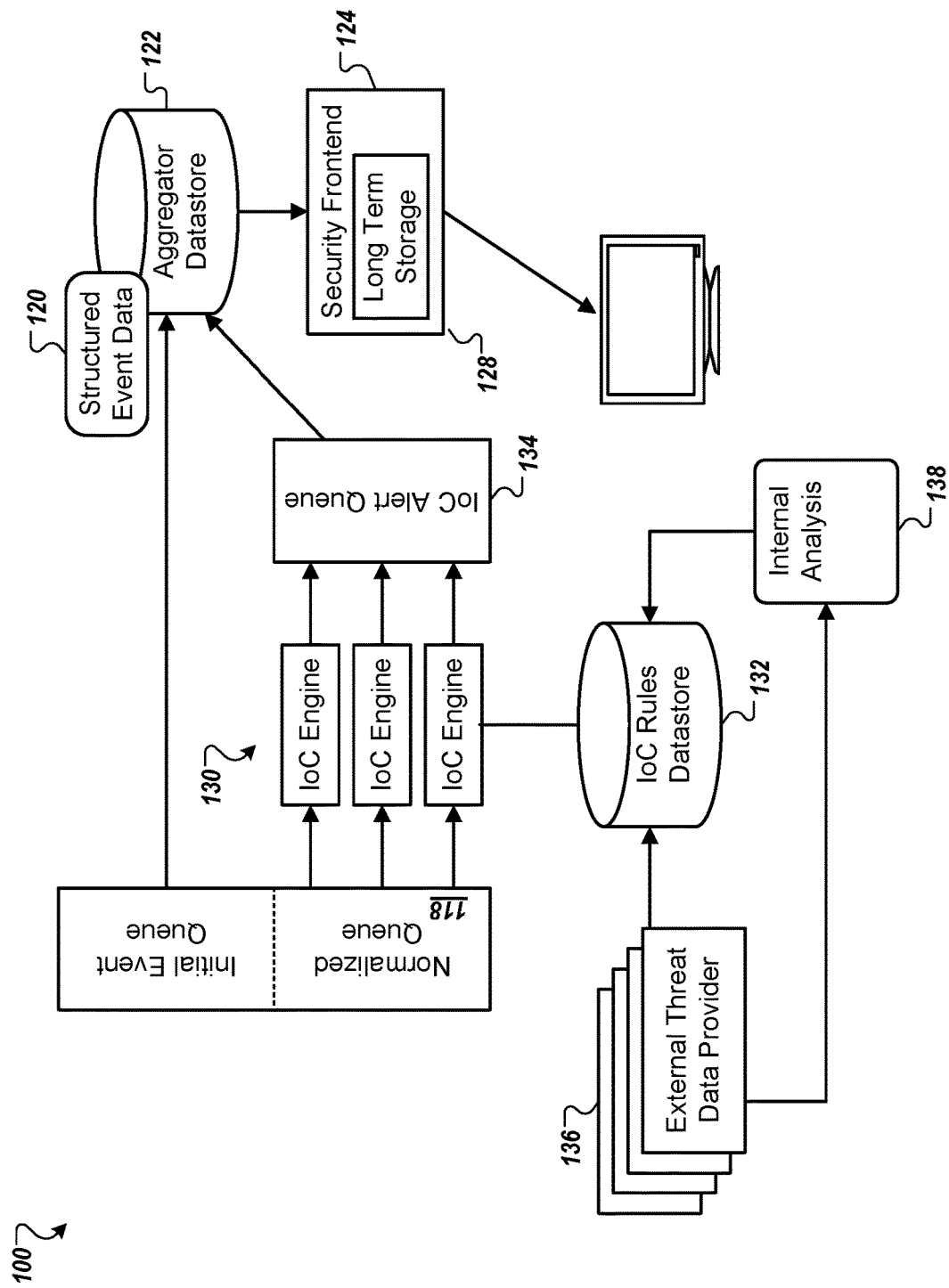

FIG. 1B is a block diagram of optional elements of the system 100. As shown here, the normalized event queue 118 can include one or more normalized queues from which network event data can be provided to the IoC engines 130 for processing against IoC rules. The IoC engines 130 can receive network event data, either structured or unstructured, along with other pertinent data to the event data, such as additional information added to the network event data in the normalizer/decorator pipelines 114. The IoC engines 130 can access one or more IoC rules from the IoC rules datastore 132 and compare the normalized event data 116 against these rules. If a normalized event data 116 matches an IoC rule, the event data can be decorated with information about the IoC rule, such as a flag or code associated with the matching rule being added to the event data that indicates the implications of the match (e.g., domain for network event is known bad/malicious domain, etc.). These decorated events can be provided to the aggregator datastore 122 for processing against the more computationally intensive rules.

The rules in the IoC rules datastore 132 can include one or more rules that are easy to process (i.e. require few computational resources to run) relative to the rules run against the aggregator datastore 122. Bifurcating processing of the more computationally simple IoC rules from the more complex rules run against the aggregator datastore 122 across different systems can create greater processing efficiency and use of processing resources. The IoC rules can include, for instance, simple pattern or string matching tests. For example, one test may be to compare an MD5 hash of an email attachment against a corpus of MD5 hashes from known-malicious historical email attachments. Since MD5 hashes are not truly unique and hash-collisions of different files are possible, this processing can provide a likely indicator of potentially malicious email traffic. However, because comparing MD5 hashes are computationally simple, this test can be performed quickly and can provide an efficient determination of potentially malicious events.

In some implementations, the IoC rules datastore 132 can include a dynamic rules engine to perform comparison based on the rules stored in the IoC rules datastore 132. When the rules change, the IoC rules datastore 132 can detect the change and initiate an engine rebuild to create a second rules engine using the updated rules. While the rebuild is being performed, traffic can continue to be routed to the first, older, rules engine. Then, when the rebuild is completed, the IoC rules datastore 132 can route new traffic to the second rules engine. Once all the traffic routed to the first rules engine is acted upon, the IoC rules datastore 132 can decommission the old rules engine.

The IoC engine deposits the structured event data 120 into an IoC alert queue 134. The IoC alert queue 134 can collect the received structured event data 120 for storage in the aggregator datastore 122.

The IoC rules datastore 132 can include, in some cases primarily or exclusively, security data used for the protection of the network 100. For example, one or more external threat data providers 136 can provide threat information that is stored directly in the IoC rules datastore 132. External threat data providers 136 can include servers that publish data about discovered security threats worldwide or in a particular domain. Some of the external threat data providers 136 provide their data on a free and open basis to any organization that requests the data. Some external threat data providers 136 provide their data only to authenticated requestors. This authentication can include checking authentication credentials that are only provided to paying customers, requestors that are vetted to ensure they are not potential malicious actors, etc. Examples of security data include but are not limited to hashes, IP addresses, domains, file path, file string, compile path on the local machine, username of attacker, import hash, URI, hashes of TLS certificates, etc. Rules for different data types can use different expiration timelines. For example, an IP address, which can be expected to turn over, can have an expiration of 30 or 90 days, while a domain can have an expiration of a year and a hash can be stored for multiple years.

In addition to, or in the alternative to, directly storing data from the external threat data providers 136 in the IoC rules datastore 132, internal analysis data 138 can be generated by some elements of the system 100 (e.g., the security frontend or an another shown or unshown element.) For example, the external threat data provider 136 may provide a feed of information about external threats that includes a record of an attack by a particular actor. The internal analysis 138 may include supplemental information such as a list of previous attacks against the network 100 likely performed by that same actor. As will be understood, some of the internal analysis 138 may be based on sensitive information available within the network 110 but not available to those outside of the network 100.

In some cases, the internal analysis 138 may include only additional analysis based on information from the external threat data provider. For example, the external threat data provider 136 may provide a feed of information about external threats that includes a record of a script used to attach other networks. Internal analysis 138 can be generated to record metadata of this script (e.g., the frequency of particular commands, metrics related to coding style.) As will be understood, some of the internal analysis 138 may be based on public information subjected to analysis performed by actors or elements using the network 100. This may be of particular value when some feature of the network 100 is uncommon, unique, or particular robust or vulnerable. In such a case, the internal analysis 138 may be useful for the network 100 and performed within the network 100, but being of low or no value otherwise is not performed by external actors or elements.

In some implementations, the IoCs may be indexed by one or more values that are directly read or calculated from a structured event data 120. For example, IoC's can be indexed with three fields—an IP address, a domain name, and a file hash. In addition, the IoC may have other data fields (e.g., geographic information, threat-actor identifiers, sub-domain identifiers.) Before the structured event data 120 is added to the aggregator datastore, the IoC alert queue 134 can identify one or more fields in the structured event data 120 that matches one of the indexes for an IoC. In such a case, the IoC alert queue 134 can decorate the structured event data 120 with the entire IoC. In doing so, the decorated structured event data 120 can encapsulate the entire IoC and be stored in the aggregator datastore 122 with the associated IoC in place. As will be understood, this can result in a single IoC being stored many times in the aggregator datastore 122.

While this may use more memory space than an alternative that only stored the IoC once, such a scheme can allow for much faster processing and searching of structured data events 120 through the pipeline and in the aggregator datastore 122. This may be of particular value in networks that are very large, have very many data events to process, and/or need to scale up to a large scale.

Figure 2:
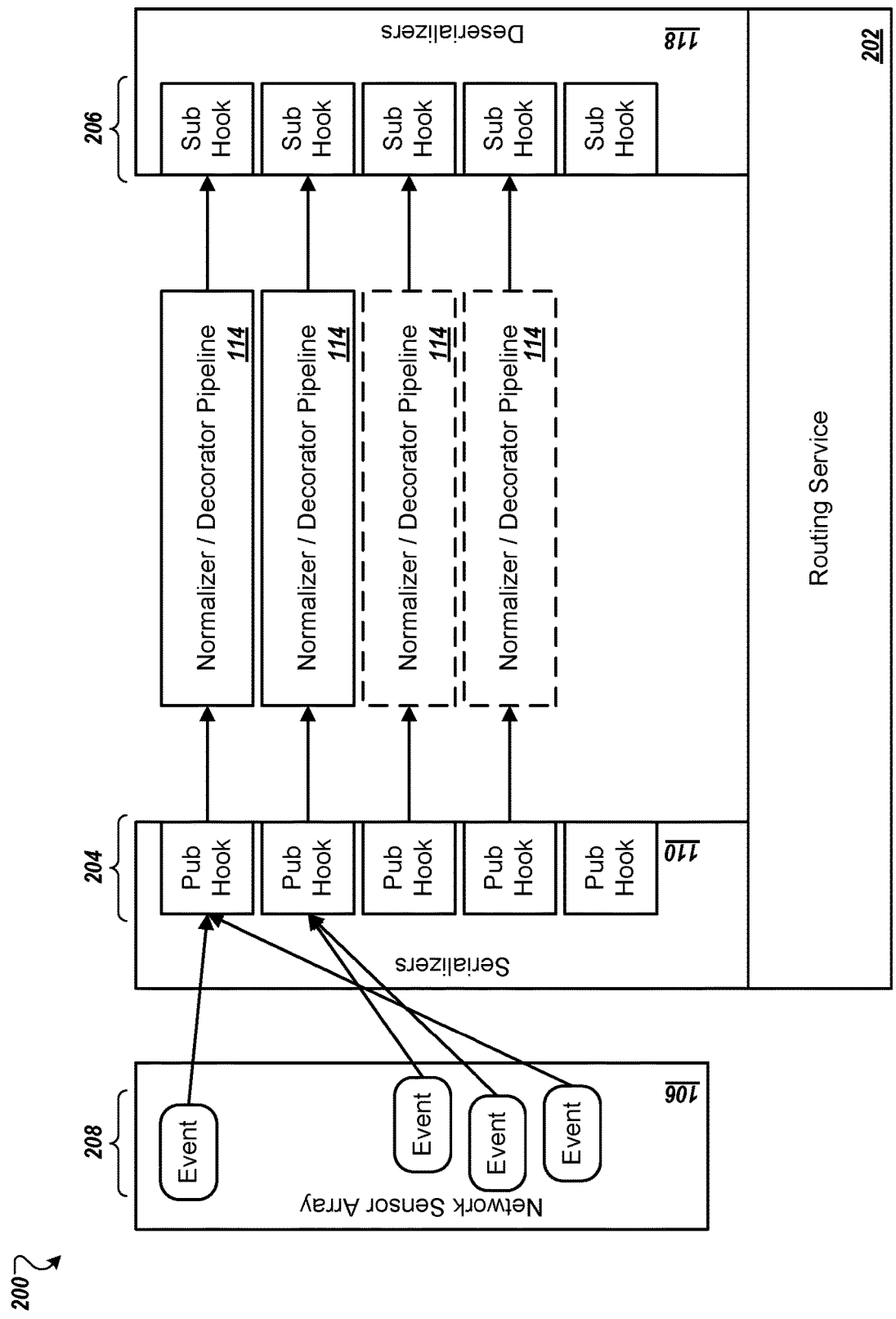
FIG. 2 is a block diagram of an example system for normalizing and decorating event data.

FIG. 2 is a block diagram of an example system 200 for normalizing and decorating event data. The system 200 shows, in greater detail, one possible configuration of some of the components of the system 100 for generation, normalization, and decoration of the event data in the system 100. However, other configurations of the elements of system 100 are possible.

In the network sensor array 106, sensors of many different types, in many different locations are positioned in the network 102. Different sensors 106 can generate events of different types. For example, a sensor 106 in an edge device such as a gateway or firewall can generate events when connections are created between resident machines 104 and machines outside of the network 102. A sensor 106 in a file-server can be configured to generate events when a resident machine 104 accesses any file, accesses a file in a restricted directory, succeeds in an authentication attempt, fails in an authentication attempt, etc.

The events can be routed to one of the initial event queues 110. As shown in this example, the initial event queues 110 and the normalized event queue 118 are both elements of or controlled by a routing service 202. The routing service can provide generalized data publication, data subscription, data queuing, and data transmission services. The routing service 202 can instantiate publication hooks 204 of the initial event queues 110 and can instantiate the subscription hooks 206 of the normalized event queue 118.

The routing service 202 can route events 208 from the network sensor array 106 to the publication hooks 204. The routing service may route the events 208 based on one or more properties of the events 208. For example, each publication hook may be associated with one or more event types. In such a case, the routing service 202 can examine each event 208 and route the event 208 to the publication hook of the associated type.

In cases when there are more events routed to a publication hook 204 than the throughput of the publication hook 204, which may be based on the speed of the normalizer/decorator pipeline 114, the routing service 202 can queue waiting events 208 and dequeue them into the publication hook 204 in order. This order may be a first-in-first-out configuration, or it could be a priority queue that dequeues the highest priority event 208 first, etc.

The routing service 202 can monitor the state of the queues to the publication hooks 204 and adjust the number of normalizer/decorator pipelines 114. For example, to avoid too much backlog, additional normalizer/decorator pipelines 114 can be created when the backlog reaches a certain size (in data size, in length of time, etc.) When the backlog falls, the routing service 202 can reduce the number of normalizer/decorator pipelines 114.

Figure 3:
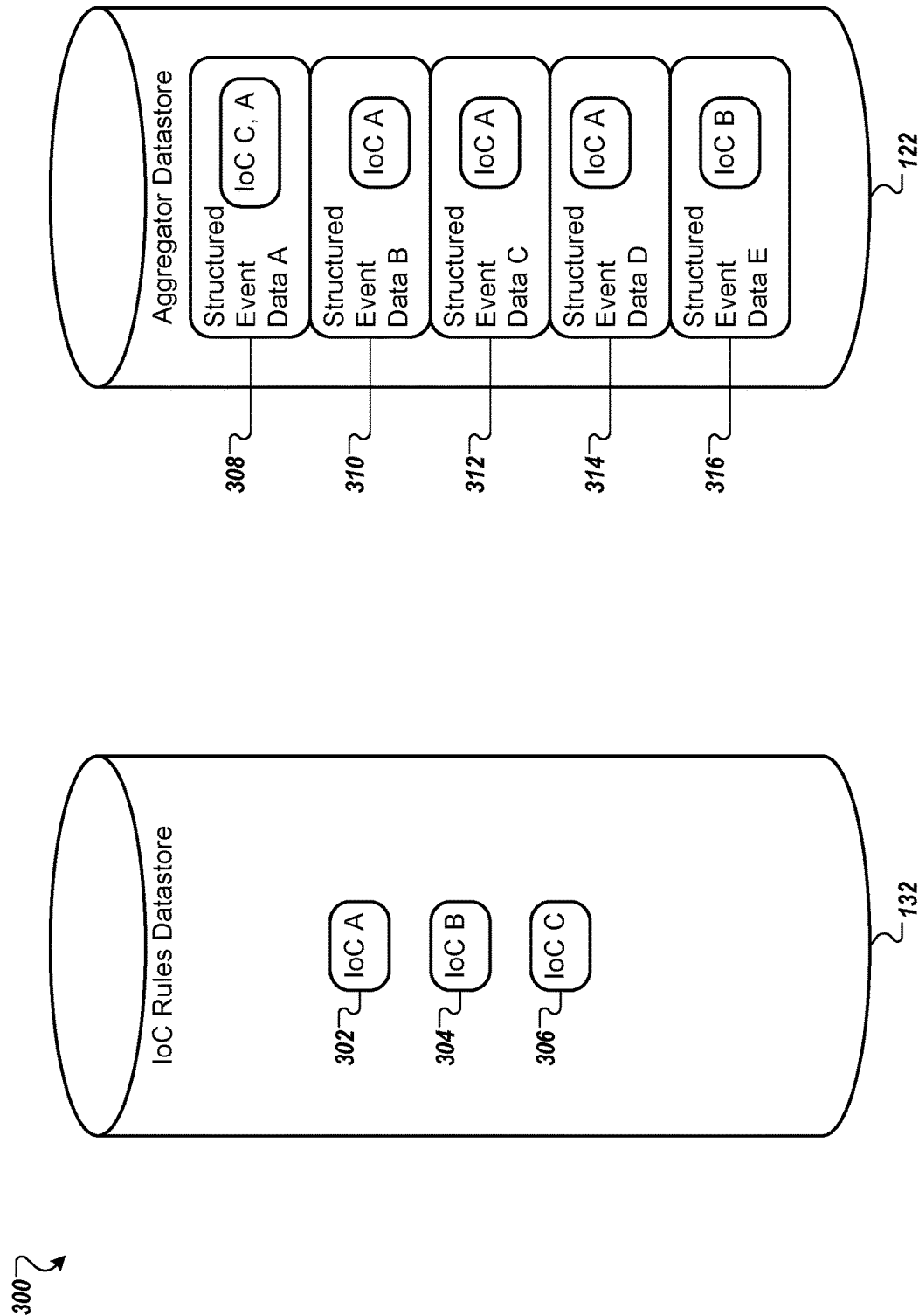
FIG. 3 is a block diagram of an example system for storage of event data.

FIG. 3 is a block diagram of an example system 300 for storage of event data. The system 300 shows, in greater detail, one possible configuration of some of the components of the system 100 for storing event data of the system 100. However, other configurations of the elements of system 100 are possible.

In the IoC rules datastore includes many memory locations, and for clarity three memory locations 302, 304, and 306 are shown. The aggregator datastore 122 includes many memory locations, and for clarity three memory locations are shown. In the IoC rules datastore 132, IoCs are stored, including a different IoC in each of the memory locations 302, 304, and 306. In the aggregator datastore 122, structured event data objects are stored in memory locations 308-316.

The event data objects in the memory locations 310, 312, and 314 are similarly decorated in that each one has been decorated with the same IoC. As shown, each of the memory locations 310, 312, and 314 redundantly store a separate copy of the same IoC. The event data objects in memory locations 308 and 316 are differently decorated in that they are decorated with different IoCs than each other. As such, these two event data objects encapsulate different IoCs. Some memory locations, can store multiple IoCs as shown in memory location 308. In addition, some of the memory locations may store indicators of reasons (e.g., fields) which caused a match to the IoC stored.

In this example, the memory locations 308-316 are shown as contiguous memory locations that are next to each other on disk. In some configurations, the memory locations 308-316 are non-contiguous, including being spaced across different disks. In some implementations, registers of one or more of the memory locations 308 may be stored across multiple disks and in repeat fashion, for example for improved up-time and responsiveness to queries.

Figure 4:
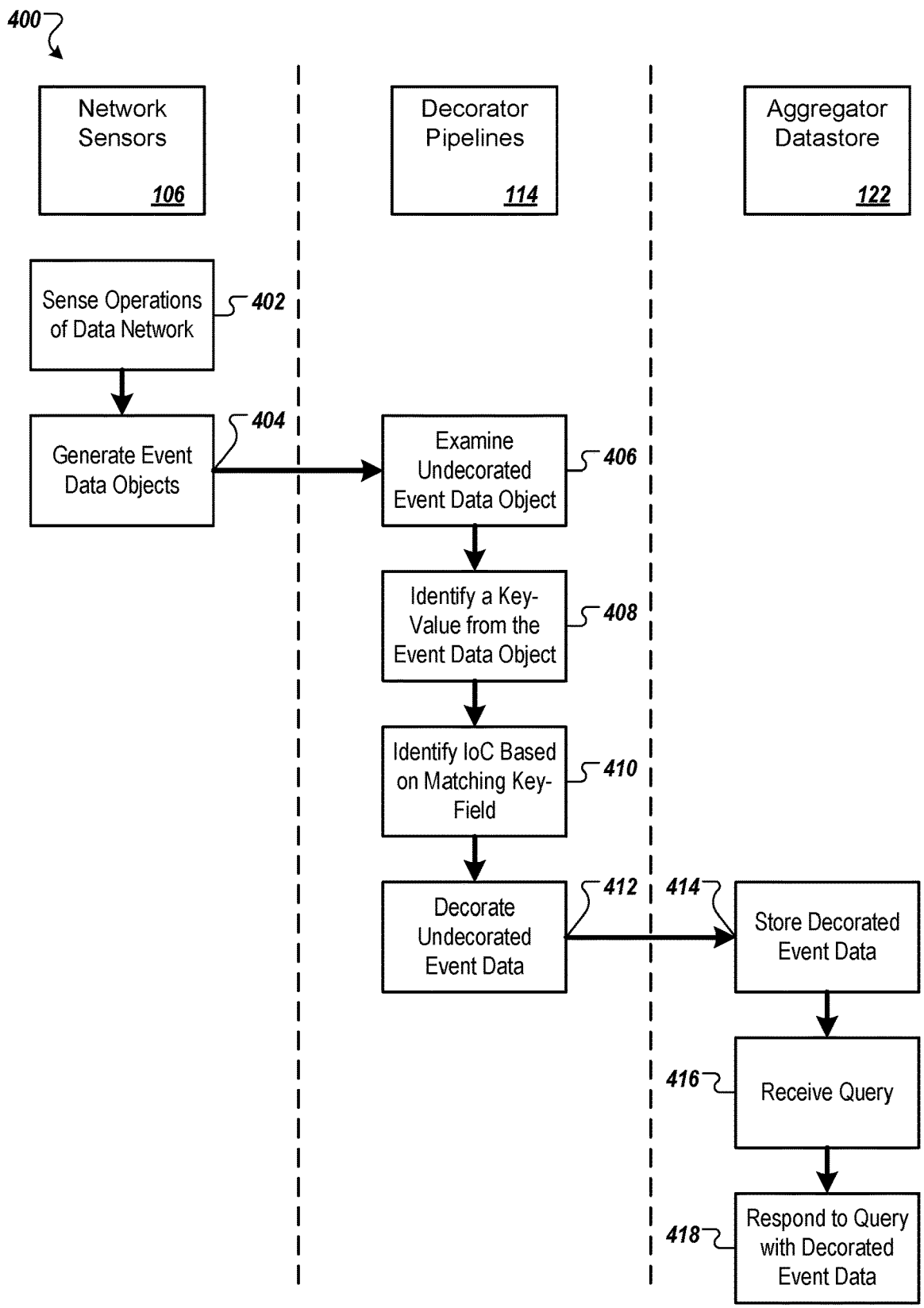
FIG. 4 is swimlane diagram of an example process for generating and serving event data.

FIG. 4 is swimlane diagram of an example process 400 for generating and serving event data. In the process 400, event data related to the operation of a data network is generated and analyzed. The process 400 can be performed, for example, by elements of the system 100 which will therefore be used as the basis of an example described below. However, another system or systems may be used to perform the process 400 or another similar process.

The network sensors 106 sense operations of the data network (402.) For example, as the data network 100 passes traffic, including traffic across the data network 100's boundary, the network sensors 106 can sense this activity. For example, the sensors may sniff network traffic and respond when network activity is found.

The network sensors 106 generate event data objects that record the operations of the data network (404.) For example, the network sensors 106 can collect information about the traffic on the network and generate data objects called event data objects that record, for example, data moved in the network (e.g., copy a file) or data about the data moved in the network (e.g., a timestamp or hash of the file.) This information can be handled as a single data object and can be addressed, serialized, transmitted, etc. as a single unit.

The decorator pipelines 114 examine an undecorated event data object (406.) For example, when the network sensors 106 generate the event data object, they can provide the event data object, which has not yet been decorated, to one of the decorator pipeline 114. The decorator pipeline 114 can perform one or more processing steps on the undecorated event data object, such as normalizing the data into a standard format.

The decorator pipelines 114 identify a key-value from the undecorated event data object (408) and identify, in an Indicator of Compromise (IoC) datastore, an IoC based on a matching of a key-field of the IoC with the key-value (410.) For example, the decorator pipeline 114 can examine data fields of the undecorated event data object that includes an Internet Protocol (IP) address, domain name, or file hash and search in the IoC rules datastore 132 for an IoC that has a matching IP address, domain name, and/or file hash. In some cases, the undecorated data object enters the decorator pipeline 114 with a hash-value generated by hashing a file of an operation of the data network, and the decorator pipeline 114 is configured to identify the identified IoC based on a matching of a hash-field of the IoC with the hash-value.

The decorator pipelines 114 decorate the undecorated event data with the identified IoC to generate a decorated event data object (412.) For example, the decorator pipeline 114 can edit one or more data fields of the undecorated data object to store (or encapsulate) the identified IoC. In doing so, the undecorated event data object is edited into a decorated event data object.

The aggregator datastore 122 stores the decorated event data object (414). For example, the decorator pipeline 114 can send the decorated event data object to the aggregator datastore 112 and the aggregator datastore 112 can write the decorated event data object, including the encapsulated IoC, to disk.

The aggregator datastore 122 receives a query (416) and returns the decorated event data object (418.) For example, the security a user of the security frontend 124 or an automated process can select a query that specifies one or more search parameters. The aggregator datastore 122 can receive this query, identify the decorated event data object (and possibly other objects) as matching the query, and return the decorated event data object.

Figure 5:
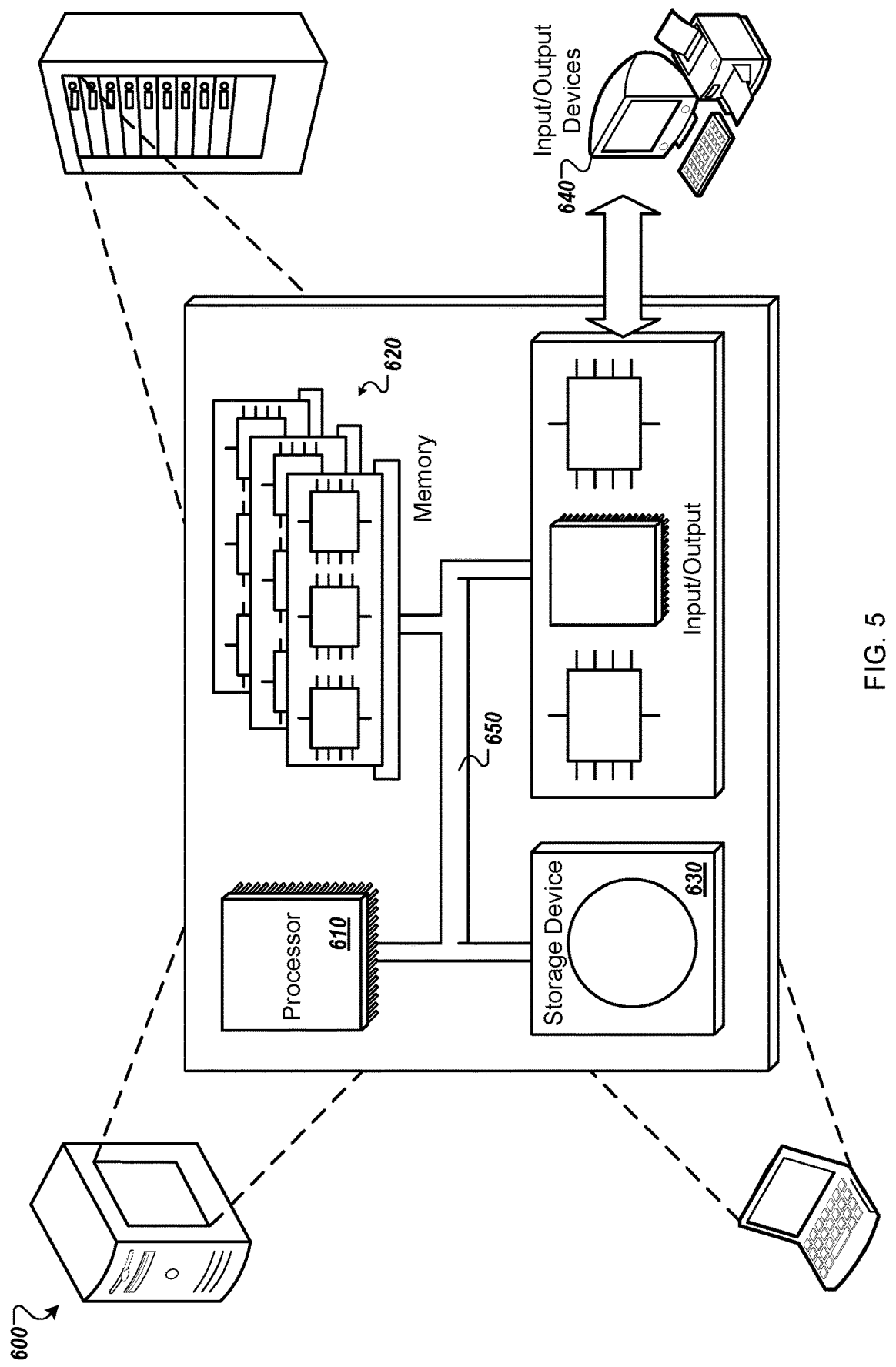
FIG. 5 is a schematic diagram that shows an example of a computing device and a mobile computing device.

FIG. 5 is a schematic diagram that shows an example of a computing system 500. The computing system 500 can be used for some or all of the operations described previously, according to some implementations. The computing system 500 includes a processor 510, a memory 520, a storage device 530, and an input/output device 540. Each of the processor 510, the memory 520, the storage device 530, and the input/output device 540 are interconnected using a system bus 550. The processor 510 is capable of processing instructions for execution within the computing system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the computing system 500. In some implementations, the memory 520 is a computer-readable medium. In some implementations, the memory 520 is a volatile memory unit. In some implementations, the memory 520 is a non-volatile memory unit.

The storage device 530 is capable of providing mass storage for the computing system 500. In some implementations, the storage device 530 is a computer-readable medium. In various different implementations, the storage device 530 may be a floppy disk device, a hard disk device, an optical disk device, or a tape device.

The input/output device 540 provides input/output operations for the computing system 500. In some implementations, the input/output device 540 includes a keyboard and/or pointing device. In some implementations, the input/output device 540 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semi-conductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

What is claimed is:

1. A system for the generation and analysis of event data related to the operation of a data network, the system comprising:
   a plurality of network sensors comprising at least one processor and computer memory, the plurality of network sensors configured to:
   sense operations of the data network;
   responsive to sensing the operations of the data network, generate event data objects that record the operations of the data network, each event data object being handled by the system as a single unit; and
   route each event data object to one or more event queues; and
   one or more decorator pipelines comprising at least one processor and computer memory, the one or more decorator pipelines configured to:
   receive an undecorated event data object from at least one of the event queues,
   examine an undecorated event data object;
   identify a key-value from the undecorated event data object;
   identify, in an Indicator of Compromise (IoC) datastore, an IoC based on a matching of a key-field of the IoC with the key-value;
   decorate the undecorated event data object with the identified IoC to generate a decorated event data object that comprises both the undecorated event data and a copy of the identified IoC;
   route the decorated event data object to one or more alert queues; and
   store the decorated event data object from the one or more alert queues in an event datastore which stores a plurality of similarly-decorated event data objects that have each been decorated with a same IoC such that the same IoC is stored redundantly by the event datastore in memory locations.

2. The system of claim 1, the system further comprising the event datastore, the event datastore configured to:
   receive a query; and
   responsive to receiving the query, returning the decorated event data object.

3. The system of claim 1, wherein the IoC datastore stores data received from a threat data provider external to the data network and also stores data from analysis performed within the data network.

4. The system of claim 1, wherein the key-field is one of the group consisting of Internet Protocol (IP) address, domain name, and file hash.

5. The system of claim 4, wherein the undecorated data object enters the decorator pipeline with a hash-value generated by hashing a file of an operation of the data network, and wherein the decorator pipeline is configured to identify the identified IoC based on a matching of a hash-field of the IoC with the hash-value.

6. A non-transitory computer-readable media having instructions that, when executed by a processor, cause the processor to perform operations comprising:
   accessing a plurality of network sensors comprising at least one processor and computer memory, the plurality of network sensors configured to:
   sense operations of a data network, each event data object being handled by as a single unit; and
   route each event data object to one or more event queues;
   responsive to sensing the operations of the data network, generate event data objects that record the operations of the data network; and
   generating one or more decorator pipelines comprising at least one processor and computer memory, the one or more decorator pipelines configured to:
   receive an undecorated event data object from at least one of the event queues;
   examine an undecorated event data object;
   identify a key-value from the undecorated event data object;
   identify, in an Indicator of Compromise (IoC) datastore, an IoC based on a matching of a key-field of the IoC with the key-value;
   decorate the undecorated event data_object with the identified IoC to generate a decorated event data object that comprises both the undecorated event data and a copy of the identified IoC;
   route the decorated event data object to one or more alert queues; and
   store the decorated event data object from the one or more alert queues in an event datastore which stores a plurality of similarly-decorated event data objects that have each been decorated with a same IoC such that the same IoC is stored redundantly by the event datastore in memory locations.

7. The computer-readable media of claim 6, wherein the event datastore configured to:
   receive a query; and
   responsive to receiving the query, returning the decorated event data object.

8. The computer-readable media of claim 6, wherein the IoC datastore stores data received from a threat data provider external to the data network and also stores data from analysis performed within the data network.

9. The computer-readable media of claim 6, wherein the key-field is one of the group consisting of Internet Protocol (IP) address, domain name, and file hash.

10. The computer-readable media of claim 9, wherein the undecorated data object enters the decorator pipeline with a hash-value generated by hashing a file of an operation of the data network, and wherein the decorator pipeline is configured to identify the identified IoC based on a matching of a hash-field of the IoC with the hash-value.

11. A method comprising:
    accessing a plurality of network sensors comprising at least one processor and computer memory, the plurality of network sensors configured to:
    sense operations of the data network, each event data object being handled as a single unit; and
    route each event data object to one or more event queues;
    responsive to sensing the operations of the data network, generate event data objects that record the operations of the data network; and
    generating one or more decorator pipelines comprising at least one processor and computer memory, the one or more decorator pipelines configured to:
    receive an undecorated event data object from at least one of the event queues,
    examine an undecorated event data object;
    identify a key-value from the undecorated event data object;
    identify, in an Indicator of Compromise (IoC) datastore, an IoC based on a matching of a key-field of the IoC with the key-value;
    decorate the undecorated event data_object with the identified IoC to generate a decorated event data object that comprises both the undecorated event data and a copy of the identified IoC;

route the decorated event data object to one or more alert queues; and store the decorated event data object from the one or more alert queues in an event datastore which stores a plurality of similarly-decorated event data objects that have each been decorated with a same IoC such that the same IoC is stored redundantly by the event datastore in memory locations.

12. The method of claim 11, wherein the IoC datastore stores data received from a threat data provider external to the data network and also stores data from analysis performed within the data network.

13. The method of claim 11, wherein the key-field is one of the group consisting of Internet Protocol (IP) address, domain name, and file hash.

14. The method of claim 13 wherein the undecorated data object enters the decorator pipeline with a hash-value generated by hashing a file of an operation of the data network, and wherein the decorator pipeline is configured to identify the identified IoC based on a matching of a hash-field of the IoC with the hash-value.

15. The system of claim 1, wherein the IoC datastore maintains, separate from the event datastore, a copy of each IoC such that each IoC stored redundantly by the event datastore is also stored in the IoC datastore.

16. The system of claim 1, wherein the event datastore is configured to arrange the memory locations in contiguously and next to each other on disk.

* * * * *